Jan. 26, 1954 — W. H. VOGELSBERG — 2,667,115
TOASTER
Filed Sept. 7, 1948
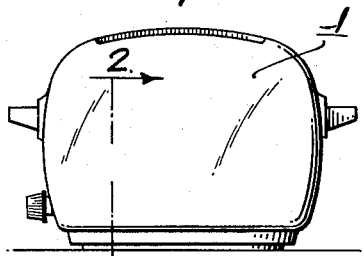
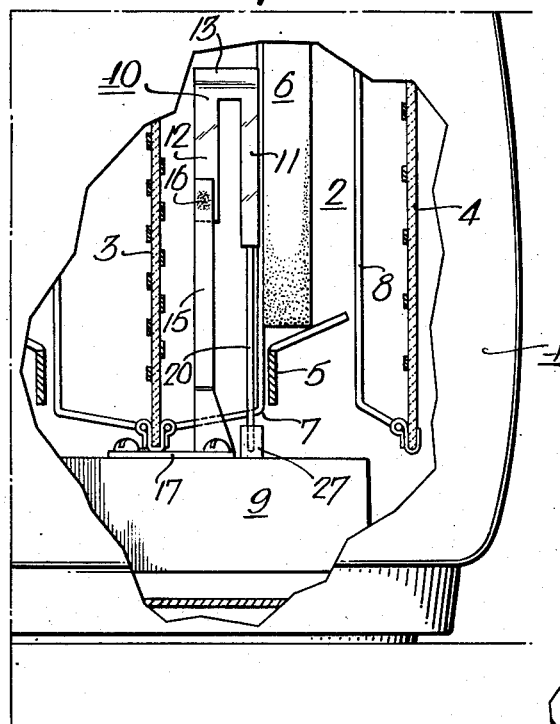
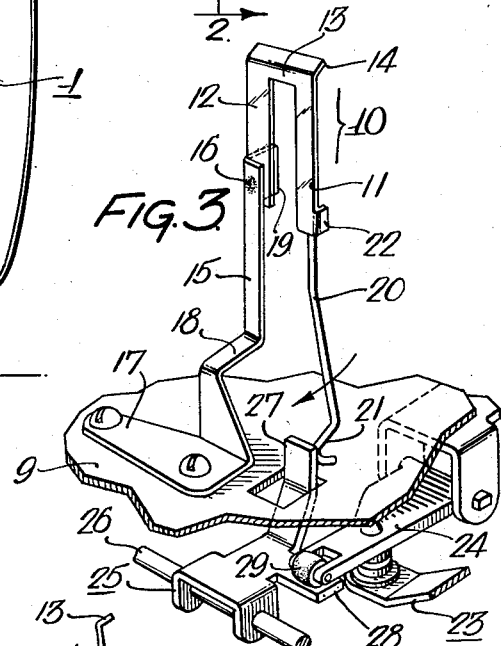
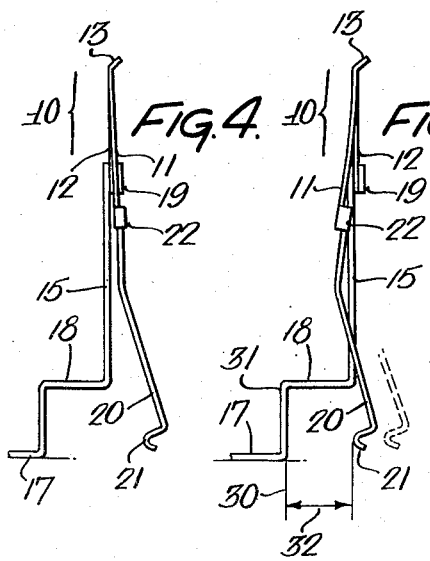
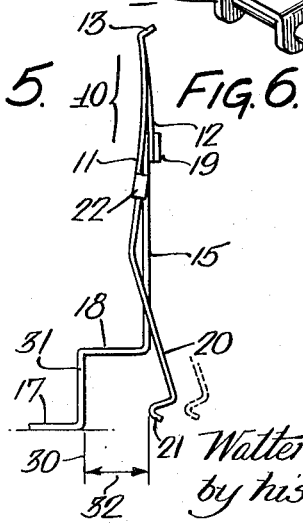
Inventor:
Walter H. Vogelsberg
by his Attorneys
Howson & Howson Patented Jan. 26, 1954

2,667,115

UNITED STATES PATENT OFFICE 2,667,115

TOASTER

Walter H. Vogelsberg, Wayne, Pa., assignor to Proctor Electric Company, Philadelphia, Pa., a corporation of Pennsylvania Application September 7, 1948, Serial No. 48,111

3 Claims. (Cl. 99—331)

This invention relates to thermostatic devices for controlling the heating of an object according to the acquired temperature thereof. In its more limited aspect, the invention relates to thermostatic devices for bread toasters wherein control of the toaster heating elements is effected in response to the surface temperature of a bread slice being toasted. Accordingly, the invention will be described with specific reference to such application.

With respect to toasters generally, it is desirable that successive slices of bread be toasted uniformly to substantially the same color according to the desire of the user, and such is the purpose of thermostatic devices which comprise a thermomotive element arranged to respond to the surface temperature of the bread. However, when a thermostat is placed inside the toasting well of a toaster, it tends to produce an objectionable "shadow" on the bread, and it is subjected to extraneous heats other than that of the toasting bread. The general air temperature within the toasting well is one such heat, while the heat radiated from the toaster heating elements is another. Such extraneous heats tend to produce non-uniformity of color of the successive bread slices when the toasting operation is commenced with the toaster in a cold condition. Therefore, it is necessary to provide some means to compensate for the deleterious effect of such extraneous heats on the controlling action of the thermomotive element which is intended to respond to the surface temperature of the bread.

Various thermostatic devices embodying a compensating thermomotive element have been proposed and utilized in the past, but they have not been entirely satisfactory for one or more of a number of reasons, such as inherent tendency toward non-uniformity of manufacture and consequent non-uniformity of operation, complexity of construction and consequent difficult and expensive manufacture, undesirable effects on the toasting operation, and variations between the physical properties of bimetal elements which have been stamped from different sheets of the same bimetal material. For example, where loose mountings and pivotal connections are employed in such devices, the frictional resistance to movement of the parts becomes an important factor which tends to cause non-uniformity both in manufacture and operation. It should be remembered that thermostatic devices are fairly delicate mechanisms and are easily affected by adverse influences. Moreover, structures of the character above mentioned increase the manufacturing cost.

As regards adverse effect upon the toasting operation, it should be noted that a thermostat which is to respond to the surface temperature of a bread slice must be interposed between the heating element and the bread slice, and if any part of the thermostat is of substantial area in a plane parallel to the planes of the heating element and the bread slice, an objectionable "shadow" will be produced on the surface of the bread in the form of an untoasted and uncolored area.

With the foregoing in mind, one object of the present invention is to provide a novel compensated thermostat which obviates the aforementioned objections and difficulties.

Another object of the invention is to provide a thermostat which will have no objectionable shadow-producing effect on the toasting bread surface.

Another object of the invention is to provide an extremely simple compensated thermostat which can be easily and uniformly manufactured, being free of any loose mountings or pivotal connections, and which will operate uniformly.

Other objects and features of the invention will be apparent from the following detailed description with reference to the accompanying drawing, in which:

Fig. 1 is an extremely-small scale side elevational view of a toaster embodying the invention;

Fig. 2 is a relatively large-scale fragmentary view which, for the most part, is a sectional illustration taken along the line 2—2 of Fig. 1;

Fig. 3 is a perspective view showing the thermostat and a suitable switch mechanism operable thereby; and Figs. 4 to 6 are somewhat exaggerated operational views of the thermostat.

The present invention is not concerned with the details of construction of the toaster and the operating mechanism thereof, which may be of any suitable character.

Since the two-well toaster is widely sold and used, the invention will be described with reference to such a toaster. Fig. 1 is a miniature illustration of a two-well toaster designated generally by reference character 1 which embodies the thermostat of the present invention as shown in Fig. 2 and now to be described.

Referring to Fig. 2, one of the bread-receiving wells is shown at 2 between the central heating unit 3 and one of the side heating units 4. The bread support 5 is part of the bread carriage, being adapted to support a bread slice, as shown at 6, within the well 2. The usual vertical wire elements 7 and 8 define the well proper, the support 5 being so shaped that the bread slice 6 tends to rest against the inner wires 7. The toaster has a hollow base structure 9 within which the operating mechanism is disposed.

In accordance with the present invention, there is provided a novel compensated thermostat designated generally by reference character 10, which comprises an inverted U-shaped structure having thermomotive legs 11 and 12, and a rigid transverse portion 13 which serves to interconnect said legs at one end. Preferably, the U-shaped thermostat is formed from a single bimetallic sheet, the legs 11 and 12 thus becoming bimetallic thermostatic elements which will flex in one sense when subjected to heat. By forming the U-shaped thermostat from a single bimetallic sheet, the inherent variations which might result in the physical properties if the legs were stamped from different sheets of the same bimetallic material are eliminated. The transverse portion 13 may be flanged as at 14 (see Fig. 3) to increase its rigidity. The bimetal leg 11 constitutes the primary thermomotive element while the bimetal leg 12 constitutes the compensating thermomotive element. The two parallel legs normally reside substantially in a common plane and they flex out of such plane when subjected to heat.

As shown in Fig. 2, the thermostat 10 is interposed between the heating element 3 and the bread slice position, with the general plane of the two thermostat legs substantially perpendicular to the planes of the heating element and the bread slice, and with the leg 11 in close proximity to the bread slice 6. Since the thermostat is very narrow in a direction parallel to the latter planes, it does not cause an objectionable "shadow" on the bread surface. The thermostat is supported on a rigid standard or post 15, the lower end of leg 12 being secured to the upper end of said post, as by welding indicated at 16. The post 15 should be formed of material having low heat conductivity, such as stainless steel, and may be polished or plated to present a highly reflective surface. The post is supported on the base member 9 by means of a bracket 17 which may be integral with the post. As illustrated, the post preferably has an offset 18 to position the thermostat away from the post mounting so as to enable free action of the thermostat.

It will be seen from the subsequent description that the effective length of the compensating bimetal element 12 is important and must be accurately established. In order more readily to accomplish this, a flange 19 is provided at the upper end of the post 15, which flange enables easy accurate positioning of the leg 12 relative to the supporting post during quantity production of thermostats of the character here involved.

The lower end of the primary bimetal leg 11 is free to move and this leg carries a relatively stiff wire extension 20 having a suitably formed end portion 21 for actuating a suitable switch mechanism, as presently to be described. The wire 20 may be secured to the lower end of leg 11 in any suitable manner, as by welding, a flange 22 preferably being provided at the lower end of said leg to facilitate attaching of the wire 20.

By way of illustration, there is shown in Fig. 3 a particular switch mechanism which may be actuated by the thermostat to control the energizing circuit of the toaster heating elements. This mechanism comprises a lower switch member 23 and a pivoted upper switch member 24, the two carrying cooperating switch contacts, and a lifter 25 pivotally mounted on rod 26 and adapted to be actuated by the wire 20 to lift the upper switch member 24 so as to effect the disengagement of the switch contacts. The lifter 25 has an extending finger 27 arranged to be engaged by the lower end of wire 20 moving in the direction of the arrow in Fig. 3. The lifter 25 also has a finger 28 which underlies an insulating element 29 on the end of switch arm 24. The switch mechanism shown is intended only to be representative of any suitable switch mechanism which may be actuated by the thermostat. The present invention is not concerned with the details of the switch mechanism.

It will be seen from Fig. 2 that the bimetal leg 11 is primarily responsive to the surface temperature of the bread slice 6 but is also affected by extraneous heats such as ambient or environmental conditions and by the heat radiated from the heating element 3. The compensating bimetal leg 12 is disposed substantially centrally of the space between the heating element and the bread and is therefore responsive primarily to these extraneous heats rather than the surface temperature of the bread.

In operation of the device, the compensating bimetal leg 12 effectively serves as a self-adjusting support for the primary bimetal leg 11 so as to counteract the effects of flexure of the primary leg 11 due to the extraneous heats hereinbefore mentioned. The upper end of the primary leg 11 is effectively anchored at the transverse portion 13, and the compensating leg 12 effects compensation by shifting the anchor point, it being remembered that the lower end of leg 12 is fixed by virtue of its being secured to the stationary supporting post 15.

The operation may be clearly understood by reference to Figs. 4 to 6. Assuming that the toaster is in a cold condition, the legs 11 and 12 are in their normal unflexed condition and the lower end 21 of wire 20 assumes a certain position, as shown in Fig. 4. Assume now that the toaster is put into operation. During the first toasting cycle, the primary thermomotive element 11 flexes in response to the surface temperature of the bread slice 6, as shown in Fig. 5, and the lower end of said element moves toward the left, as viewed in Fig. 5, the lower end of wire 20 moving accordingly. At a certain point in the travel of end 21, the latter will open the switch 23, 24 through the medium of the lifter 25, as above described. Of course, the position at which the end 21 opens the switch will depend upon the color adjustment in any particular instance. For a particular assumed color adjustment, Fig. 5 shows the end 21 in the position at which it opens the switch, the broken line illustration indicating the cold position of Fig. 4. For purposes of explanation, the line 30 projected downwardly from the vertical portion 31 of post 15 is taken as a fixed reference point, and it will be seen that the switch-opening position of end 21 is at a distance from the reference line 30 represented by the double-headed arrow 32. During the initial toasting cycle the compensating thermomotive element 12 is affected to a certain degree; however, the extraneous heats hereinbefore mentioned are of insufficient magnitude to cause full flexure of the element 12 evident during subsequent toasting cycles. Therefore, during the initial toasting cycle, the element 12 takes a position between the cold position as shown in Fig. 4 and the position of Fig. 6.

When the heating element circuit is interrupted at the end of the initial cycle, the primary element 11 cools somewhat but not sufficiently to return the lower end 21 of wire 20 to the cold position. The rising temperature within the toaster will have imparted to the element 11 a certain amount of flexure, and therefore the lower end 21 of wire 20 will return to some position intermediate those indicated in Fig. 5. In other words, the element 11 is biased by the above-mentioned extraneous heats toward the switch-operating position. In the absence of any compensation and assuming that the upper end of element 11 remained stationary, this biasing effect would shorten the toasting time and would cause opening of the controlling switch at a bread surface temperature less than that at which the switch is intended to be opened. Consequently, the next bread slice would be toasted to a lighter color than that desired. The compensating element 12 prevents this undesired non-uniformity of the toasting of successive bread slices.

As the primary element 11 acquires the above-mentioned biasing flexure, the compensating bimetal element 12 acquires a similar flexure due primarily to the extraneous heats above mentioned. Consequently, the transverse portion 13 moves slightly toward the left, as viewed in Figs. 4 to 6, and this has the effect of slightly tilting the primary element 11 as shown in Fig. 6. Therefore, the lower end 21 of wire 20 is required to move through the same distance as it did during the initial toasting operation to open the controlling switch, and since such movement is in response to the surface temperature of the bread slice, the successive bread slices are toasted to the same degree and to the same color.

It should be noted that the primary thermomotive element 11 moves parallel to the bread surface, and therefor it responds constantly and uniformly to the bread surface temperature during each toasting cycle. Moreover, the compensating bimetal element 12 moves parallel to both the bread surface and the plane of the heating element 3, thus being uniformly responsive to the extraneous heats above mentioned.

In addition, it can be seen from Figs. 4 to 6 that movement of the thermostat parallel to the bread slice uncovers areas previously shielded by certain portions of the thermostat and thereby helps prevent "shadow" formation upon the bread slice.

As an additional refinement, the two bimetal legs may be made further discriminatory with respect to the heating influences by differently coloring their surfaces. As is well known, any body exposed to radiant heat will absorb the heat at a rate dependent upon the color or reflective characteristic of the body. It has been determined that if the primary leg 11 is provided with a dull black finish, such as is obtained by dipping it in suitable silicon-resin pigment with a darkening agent such as powdered manganese dioxide, the leg will be more responsive to radiant heat from the toasting bread as the color thereof changes. To minimize the effect of the temperature of the bread upon the compensator leg 12, that leg may be plated with a layer of metal having highly reflective characteristics. Thus, the compensator leg will be made more responsive to the extraneous heats and less responsive to changes in radiant heat from the surface of the bread.

From the foregoing description, it will be seen that the invention provides an extremely simple compensating thermostat which is free of any loose mountings, pivotal connections, or other mechanical complexities which deleteriously affect the manufacture and operation. Therefore, the device may be uniformly manufactured in quantity and it requires no servicing adjustment. Moreover, it has the other advantages mentioned.

In the preferred form of the thermostat as illustrated and described, the thermostat is a U-shaped structure including the transverse portion 13. However, the structure could be V-shaped, dispensing with the said portion. In such case, the thermostat could be formed of two bimetal strips, arranged in a V with contacting ends of the strips overlapped and welded together.

Thus while a single embodiment of the invention has been illustrated and described for the purpose of disclosure, it will be understood that the invention is not thus limited but is capable of various modifications and other embodiments.

I claim:

1. In a bread toaster, means for supporting a bread slice in position to be toasted, heating means in spaced relation to the bread position to toast the bread slice, a substantially U-shaped bimetal thermostat interposed between said heating means and the bread position, said thermostat being arranged in perpendicular relation to the plane of the adjacent bread surface so that the legs of the thermostat flex substantially parallel to said plane, the leg nearer the bread slice being the primary thermomotive means responsive primarily to the bread surface temperature, the leg farther from the bread slice being the compensating thermomotive means responsive primarily to extraneous heats, rigid support means to which the end of the compensating leg is secured to support the thermostat, the end of the primary leg being free to move, means operable to terminate a toasting interval, and an actuating element fixedly secured to and extending from the end of said primary leg to actuate said terminating means.

2. In a bread toaster, means for supporting a bread slice in position to be toasted, heating means in spaced relation to the bread position to toast the bread slice, a bread-sensitive thermostat interposed between said heating means and the bread position and exposed directly to the surface temperature of the bread, and means operable by said thermostat to terminate a toasting interval upon attainment of a surface temperature of the bread corresponding to a desired color of the toasted bread, said thermostat being of small dimension in a direction parallel to the plane of the bread surface, and of relatively large dimension in a direction perpendicular to said plane, and comprising an inverted substantially U-shaped structure whose legs are bimetallic thermomotive elements which flex substantially parallel to said plane, one of said elements being in close proximity to the bread slice to respond primarily to the surface temperature of the bread, the other of said elements being further from the bread slice to respond primarily to extraneous heats and serving to adjust the first element so as to compensate for the extraneous heats, the lower end of the compensating leg being fixedly supported, and the lower end of the bread temperature-responsive leg being free to move to actuate the toasting interval-termination means.

3. In a bread toaster, means for supporting a bread slice in position to be toasted, heating means in spaced relation to the bread position to toast the bread slice, a substantially U-shaped bimetal thermostat interposed between said heating means and the bread position, said thermostat being arranged in perpendicular relation to the plane of the adjacent bread surface so that the legs of the thermostat flex substantially parallel to said plane, the leg nearer the bread slice being the primary thermomotive means responsive primarily to the bread surface temperature, the leg farther from the bread slice being the compensating thermomotive means responsive primarily to extraneous heats, rigid support means to which the end of the compensating leg is secured to support the thermostat, the end of the primary leg being free to move, and means operable by said primary leg to terminate a toasting interval.

WALTER H. VOGELSBERG.

References Cited in the file of this patent

UNITED STATES PATENTS

| Number | Name | Date |
|---|---|---|
| 1,540,628 | Hurxthal et al. | June 2, 1925 |
| 2,079,382 | Myers et al. | May 4, 1937 |
| 2,099,210 | Ireland | Nov. 16, 1937 |
| 2,138,674 | Graham | Nov. 29, 1938 |
| 2,147,385 | Sardeson | Feb. 14, 1939 |
| 2,162,899 | Sardeson | June 20, 1939 |
| 2,179,811 | Brosseau | Nov. 14, 1939 |
| 2,285,156 | Gomersall | June 2, 1942 |
| 2,459,169 | Koci | Jan. 18, 1949 |